United States Patent [19]

Longora

[11] Patent Number: 4,698,967

[45] Date of Patent: Oct. 13, 1987

[54] SUPERVISING APPARATUS

[75] Inventor: Ritchie L. Longora, Germantown, Tenn.

[73] Assignee: F. L. Saino Manufacturing Co., Memphis, Tenn.

[21] Appl. No.: 859,304

[22] Filed: May 5, 1986

[51] Int. Cl.[4] ........................ F16D 31/00; E05F 15/02

[52] U.S. Cl. ........................................ 60/325; 49/27; 200/61.43

[58] Field of Search ........................................ 49/26-28, 49/31; 60/325; 318/282, 468; 200/61.43

[56] References Cited

U.S. PATENT DOCUMENTS 3,303,303 2/1967 Miller .................................. 49/27 X 4,365,188 12/1982 Walter .................................. 318/282

4,620,072 10/1986 Miller .................................. 200/61.43

FOREIGN PATENT DOCUMENTS 2158149A 11/1985 United Kingdom .................... 49/26

*Primary Examiner*—William E. Wayner

*Attorney, Agent, or Firm*—Walker & McKenzie

[57] ABSTRACT

An apparatus for supervising the operation of a pneumatic safety system of an industrial door opening/closing mechanism or the like. The apparatus includes a pressure pulse generator for generating a pneumatic pressure pulse, and a pneumatic pathway for directing the pressure pulse to the pressure switch of the door opening/closing mechanism. The integrity of the safety system is confirmed if the pressure switch is moved in response to the pressure pulse.

4 Claims, 5 Drawing Figures

SUPERVISING APPARATUS

BACKGROUND OF THE INVENTION

1. Field of the Invention:

The present invention relates in general to opening/-closing mechanisms for doors and the like and more specifically to means for supervising the integrity of a pneumatic safety system used with such opening/closing mechanisms.

2. Description of the Related Art:

A somewhat typical prior art industrial door opening/closing mechanism is somewhat diagrammatically shown in FIG. 1 wherein a door A is slidably supported by a support track B for being moved by a motorized drive unit C between opened and closed positions relative to an opening D. A hollow, compressible pneumatic nose E is attached to the leading edge of the door A for coacting with a typical pressure switch F to either deactivate the drive unit C or cause the drive unit C to reverse and open the door A if something causes the nose E to compress when the door A is closing.

A preliminary patentability search directed to class 49, subclasses 26, 27, 28 and 31; class 200, subclass 61.43; and class 340, subclass 605 resulted in the discovery of Walter, U.S. Pat. No. 4,365,188. The Walter patent discloses a circuit arrangement for monitoring and controlling closing and opening movements utilizing a hollow, compressible nose including a pair of elongated switch strips to thereby define an electric switch.

None of the known prior art, taken as a whole, disclose or suggest the present invention.

Summary of the Invention

The present invention is directed toward providing an apparatus for supervising the integrity of a pneumatic safety system of an opening/closing mechanism. The concept of the present invention is to couple a pressure pulse generating means to the pressure wave generating means of a pneumatic safety system to periodically test or check the integrity of the pneumatic safety system.

The supervising apparatus of the present invention is for use with an opening/closing mechanism having a pneumatic safety system of the type including a pressure wave generating means for selectively generating a pneumatic pressure wave and a pressure switch coupled to the pressure wave generating means for being moved from a first position to a second position if the pressure wave generating means generates a pressure wave. The supervising apparatus of the present invention includes, in general, a pressure pulse generating means for selectively generating a pneumatic pressure pulse; and a pneumatic pathway means having a first end coupled to the pressure pulse generating means and having a second end coupled to the pressure wave generating means for allowing any pneumatic pressure pulse generated by the pressure pulse generating means to pass to the pressure pulse generating means, the integrity of the pneumatic safety switch being confirmed if the pressure switch is moved to the second position in response to the generation of a pneumatic pressure pulse by the pressure generating means.

DESCRIPTION OF THE PREFERRED EMBODIMENT

Figure 1:
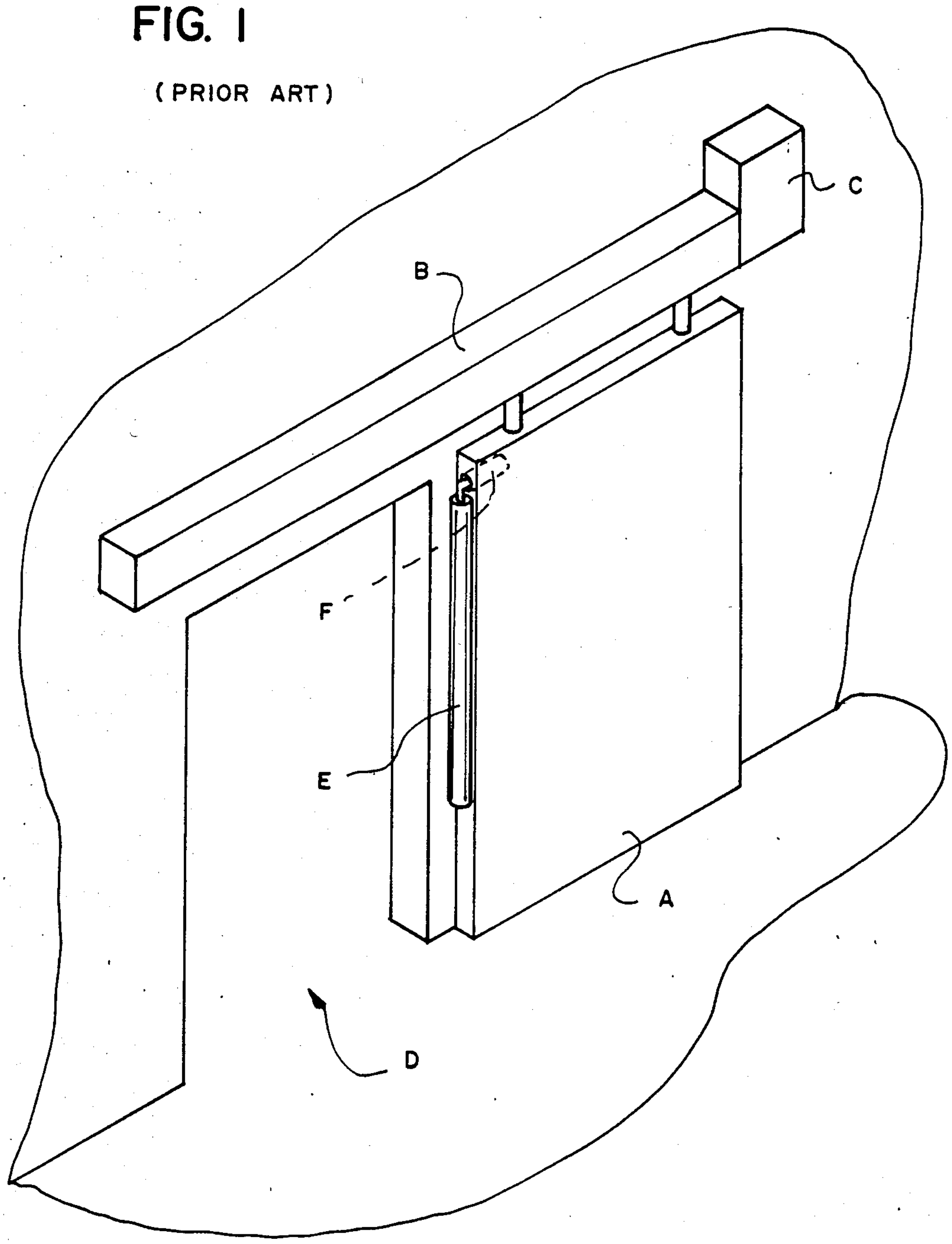
FIG. 1 (PRIOR ART)
FIG. 1 is a somewhat diagrammatic pictorial view of a prior art industrial door opening/closing mechanism.

The supervising apparatus 11 of the present invention is for use with an opening/closing mechanism having a pneumatic safety system of the type including a pressure wave generating means 13 for selectively generating a pneumatic pressure wave and including a pressure switch 15 coupled to the pressure wave generating means 13 for being moved from a first position to a second position if the pressure wave generating means 13 generates a pressure wave (see FIG. 1). In the preferred embodiment of the present invention, the opening/closing mechanism is part of a motorized industrial door opening system in which a door 17 is slidably supported by a support track 19 for movement in response to an electrical energy source 20 by a typical electric motor 21 which is coupled to the door 17 by any conventional door opening/closing drive such as a chain drive means (not shown) and which may be controlled by a motor control means 22 (see FIGS. 2 and 5) between opened and closed positions relative to an opening 23 (see FIG. 1). In the preferred embodiment of the present invention, the pressure wave generating means 13 consists of a typical hollow, compressible pneumatic nose 25 attached to the leading edge of the door 17 whereby any object within the opening 23 when the door 17 is being closed will engage and compress the nose 25 thereby causing a pneumatic pressure wave to be generated for deactivating the motor 21 or reversing the direction of movement of the door 17. In the preferred embodiment of the present invention, the pressure switch 15 is part of the motor control means 22 and consists of a typical diaphragm type pressure switch adapted to be closed upon rising pressure. The pressure switch 15 is electrically coupled between the electrical energy source 20 and the motor 21 (see FIG. 5) for deactivating or reversing the motor 21 when closed. The pressure switch 15 is preferably coupled to the nose 25 by way of an elongated hose 27 (see FIG. 2).

Figure 2:
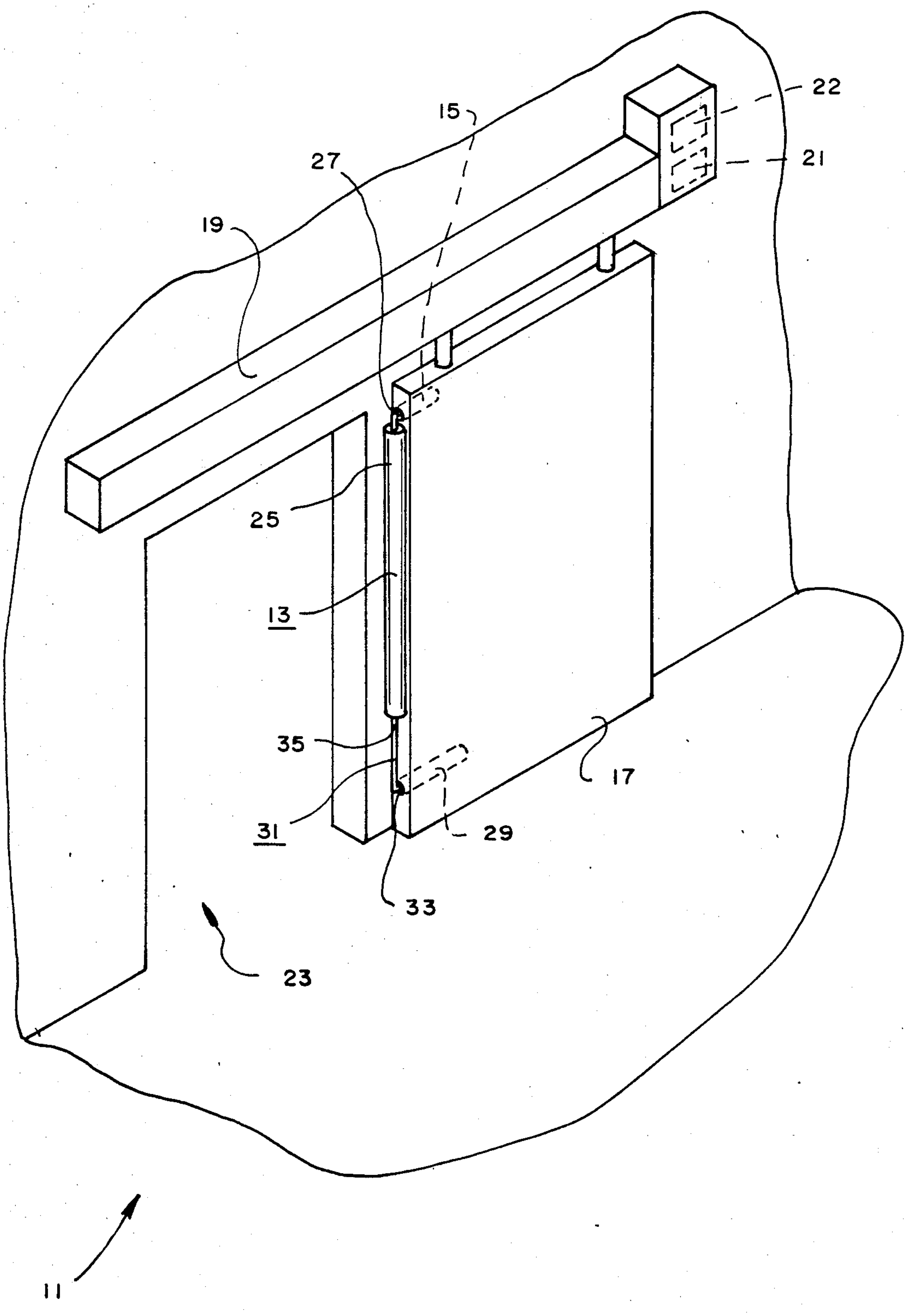
FIG. 2 is a somewhat diagrammatic pictorial view of the supervising apparatus of the present invention shown associated with an industrial door opening/closing mechanism.
Figure 3:
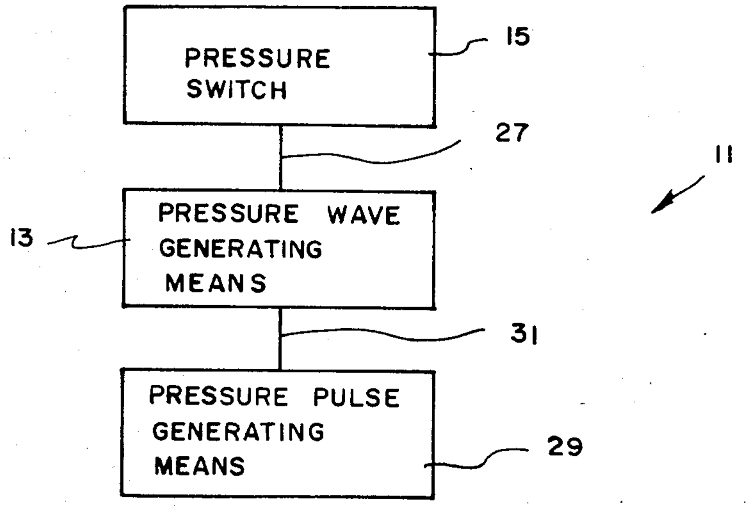
FIG. 3 is a diagrammatic view of the supervising apparatus of the present invention.

The supervising apparatus 11 of the present invention includes a pressure pulse generating means 29 for selectively generating a pneumatic pressure pulse, and a pneumatic pathway means 31 having a first end 33 coupled to the pressure pulse generating means 29 and having a second end 35 coupled to the pressure wave generating means 13 (i.e., to the nose 25) for allowing any pneumatic pressure pulse generated by the pressure generating means 29 to pass from the pressure pulse generating means 29 to the pressure wave generating means 13 (see, in general, FIG. 2). The integrity of the pneumatic safety system is confirmed if the pressure switch 15 is moved to the second position in response to the generating of a pneumatic pressure pulse by the pressure pulse generating means 29. More specifically, unless there is a defect in the pneumatic safety system such as an air leak in the hose 27, nose 25 or pressure switch 15, any pneumatic pressure pulse generated by the pressure pulse generating means 29 will pass through the pneumatic pathway means 31 from the pressure pulse generating means 29 to the nose 25 and from the nose 25 through the hose 27 to the pressure switch 15 to thereby move the pressure switch 15 from the first position to the second position.

Figure 4:
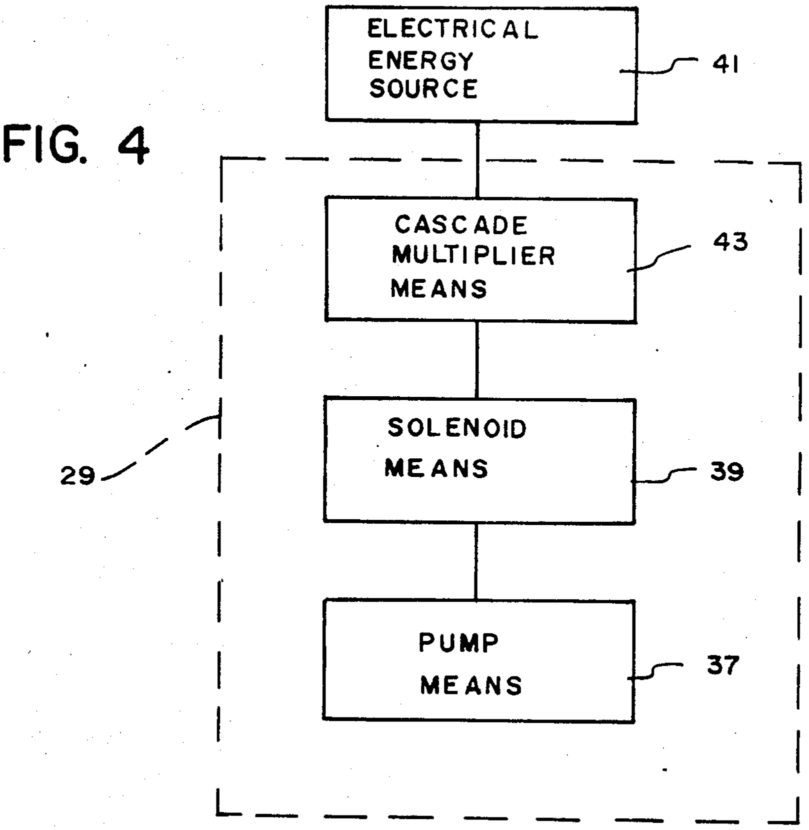
FIG. 4 is a diagrammatic view of the pressure pulse generating means of the supervising apparatus of the present invention.
Figure 5:
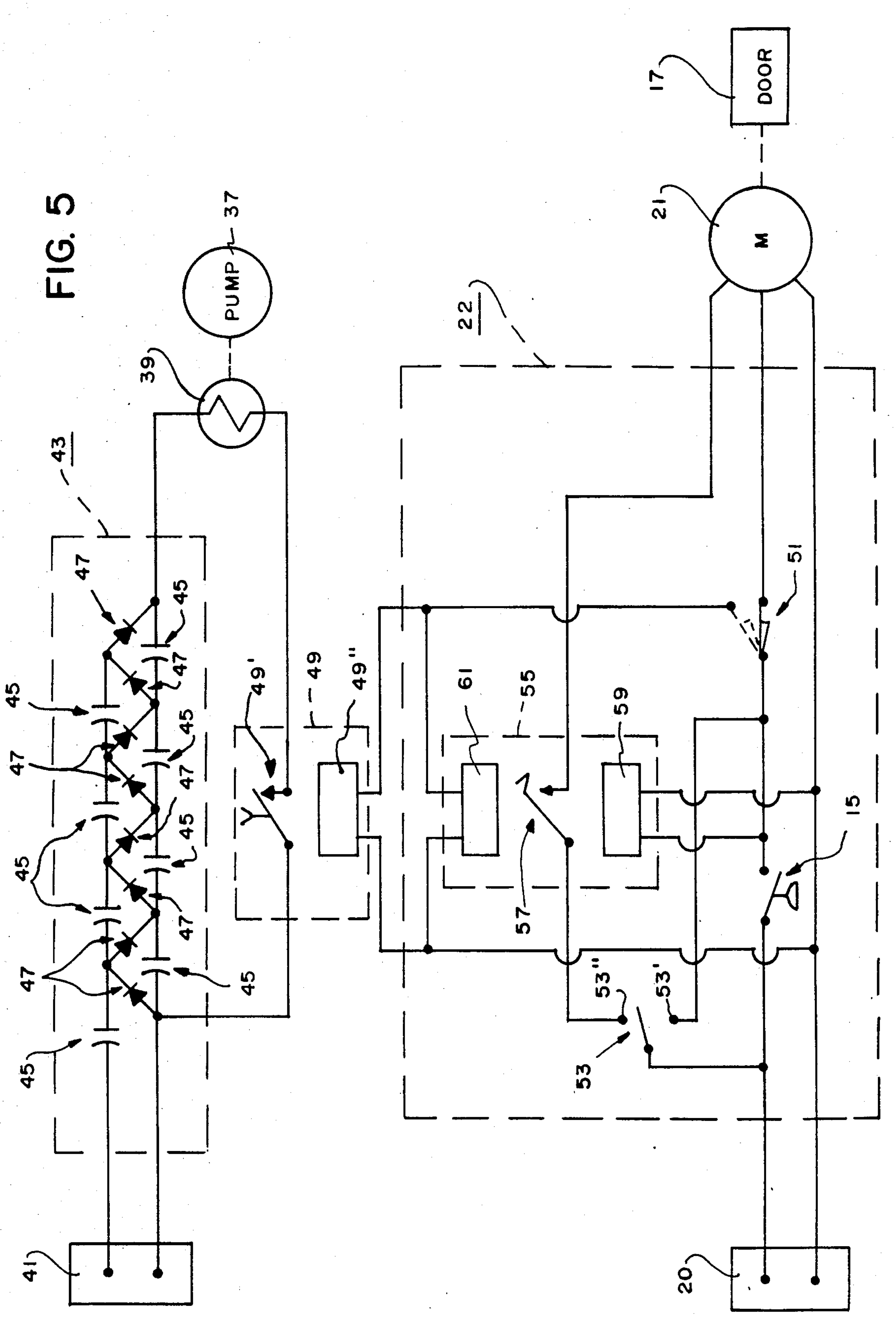
FIG. 5 is an electrical schematic view of various electrical components of the supervising apparatus of the present invention.

The pressure pulse generating means 29 of the preferred embodiment of the present invention includes a pneumatic pump means 37 for selectively producing the pneumatic pressure pulse, and an electrically operated solenoid means 39 for selectively operating the pump means 37 (see FIGS. 4 and 5). The solenoid means 39 is coupled to an electrical energy source 41. Preferably, the pressure pulse generating means 29 includes a cascade multiplier means 43 interposed in the electric circuit between the solenoid means 39 and the electrical energy source 41 for converting the voltage from the electrical energy source 41 from 24 volts alternating current to between 260 and 420 volts direct current. The electrical energy sources 20, 41 may be from the same 24 volt alternating current source. The cascade multiplier means 43 preferably consists of a combination of capacitors 45 and diodes 47 electrically coupled to one another, to the electrical energy source 41 and to the solenoid means 39 in the manner clearly shown in FIG. 5. The contacts 49' of a normally open, time delay closing relay means 49 are preferably located within the electrical circuitry between the cascade multiplier means 43 and the solenoid means 39 for controling the passage of electrical energy from the cascade multiplier means 43 to the solenoid means 39. The relay means 49 is closed to allow the passage of electrical energy from the cascade multiplier means 43 to the solenoid means 39 to thereby activate the pump means 37 in response to an electrical signal. Thus, for example, the coil 49" of the relay means 49 may be electrically coupled to the motor control means 22 for closing the contacts 49' of the relay means 49 in response to a signal from the motor control means 22. The specific signal used to close the relay means 49 may vary as will now be apparent to those skilled in the art. Thus, for example, the motor control means 22 may include a limit switch 51 which is held in a first position as shown in solid lines in FIG. 5 when the door 17 is in a closed position but which moves to a second position as shown in broken lines in FIG. 5 when the door 17 opens. The coil 49" of the relay means 49 is preferably electrically coupled to the motor control means 22 in such a manner so as to be energized when the limit switch 51 is in the second position as shown in broken lines in FIG. 5 whereby the solenoid means 39 will be activated when the motor control means 22 produces a "door open" signal by way of the limit switch 51.

The motor control means 22 typically includes a control switch 53 (see FIG. 5) which may be a typical switch member for allowing the door 17 to be selectively opened or closed by controlling the direction of rotation of the motor 21 or the like as will now be apparent to those skilled in the art. Thus, the control switch 53 may be manually moved from an opened position to a first closed position (i.e., a "door open" position) across contact 53' to cause the door 17 to open or to a second closed position (i.e., a "door close" position) across contact 53" to cause the door 17 to close.

The supervising apparatus 11 of the present invention preferably includes a double acting relay means 55 (see FIG. 5) including locking contacts 57 for allowing the motor 21 to rotate in the direction to close the door 17 when closed and when the control switch 53 is moved to the door closing position, includes a first coil 59 for moving the lock contacts 57 to the closed position, and includes a second coil 61 for moving the lock contacts 57 to the opened position. The various electrical components may be electrically coupled to one another in the manner shown in FIG. 5.

The operation of the preferred embodiment of the present invention is quite simple. Assuming the door 17 is in a closed position, the limit switch 51 will be in the first position as shown in solid lines in FIG. 5 and movement of the control switch 53 to the door open position will allow electrical energy to pass from the electrical energy source 20 to the motor 21 to cause the motor 21 to rotate in the direction to open the door 17. When the door 17 opens, the limit switch 51 will move to the second position as shown in broken lines in FIG. 5 thereby energizing the second coil 61 of the relay means 55 to open the lock contacts 57 thereof and to energize the coil 49" of the relay means 49 to move the time delay closing contacts 49' thereof to the closed position thereby activating the solenoid means 39 and the pump means 37. The pump means 37 will then send a pneumatic pressure pulse through the pneumatic pathway means 31 to the nose 25 to thereby check the integrity of the pneumatic safety system. More specifically, if the pressure wave generating means 13 and pressure switch 15 are operating properly, the pneumatic pressure pulse will cause the pressure switch 15 to close which will energize the first coil 59 of the relay means 55 causing the locking contacts 57 thereof to move to the closed position thereby allowing a subsequent movement of the control switch 53 to the door closing position to energize the motor means 23 in a manner which will cause the motor means 21 to rotate in the direction to close the door 17. It will be noted that if there is a defect in the pneumatic safety system such as a hole or the like in the nose 25 of the pressure wave generating means 13 or the pressure switch 15, the pressure switch 15 will not be moved to the closed position and the locking contacts 57 of the relay means 55 will remain open thereby preventing the motor control means 22 from signaling the motor means 21 to close the door 17.

Although the present invention has been described and illustrated relative to a preferred embodiment thereof and a preferred use therefore, it is not to be so limited since changes and modifications can be made therein which are within the full intended scope of the invention.

I claim:

1. A supervising apparatus for use with an opening/-closing mechanism having a pneumatic safety system of the type including a pressure wave generating means for selectively generating a pneumatic pressure wave and a pressure switch coupled to said pressure wave generating means for being moved from a first position to a second position if said pressure wave generating means generates a pressure wave, said supervising apparatus comprising:

(a) a pressure pulse generating means for selectively generating a pneumatic pressure pulse; and (b) a pneumatic pathway means having a first end coupled to said pressure pulse generating means and having a second end coupled to said pressure wave generating means for allowing any pneumatic pressure pulse generated by said pressure pulse generating means to pass to said pressure wave generating means, the integrity of said pneumatic safety system being confirmed if said pressure switch is moved to said second position in response to the generation of a pneumatic pressure pulse by said pressure pulse generating means.

2. The apparatus of claim 1 in which said pressure pulse generating means includes an air pump mechanism and in which said control means includes an air pump solenoid for activating said air pump mechanism.

3. The apparatus of claim 2 in which said control means includes a cascade multipler means coupled to said air pump solenoid for providing said air pump solenoid with a momentary charge of high voltage electrical current to activate said air pump mechanism.

4. The apparatus of claim 3 in which said control means includes circuit means for providing said cascade multipler means with a low voltage electrical current upon receipt of an operating signal from said opening/-closing mechanism.

* * * * *